(12) United States Patent
DePuy et al.

(10) Patent No.: US 9,096,807 B2
(45) Date of Patent: Aug. 4, 2015

(54) BIOMASS GASIFIER WITH DISRUPTION DEVICE

(75) Inventors: Richard Anthony DePuy, Schenectady, NY (US); Jinmesh Pranav Majmudar, Gujarat (IN); Omprakash Mall, Karnataka (IN); Vignesh Venkatraman, Tamil Nadu (IN); Avish Dsouza, Karnataka (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 660 days.

(21) Appl. No.: 13/416,056

(22) Filed: Mar. 9, 2012

(65) Prior Publication Data
US 2013/0232873 A1 Sep. 12, 2013

(51) Int. Cl.
B01J 7/00 (2006.01)
C10J 3/26 (2006.01)
C10J 3/32 (2006.01)

(52) U.S. Cl.
CPC .... C10J 3/26 (2013.01); C10J 3/32 (2013.01); C10J 2300/0906 (2013.01); C10J 2300/0916 (2013.01); C10J 2300/0956 (2013.01); C10J 2300/165 (2013.01)

(58) Field of Classification Search
CPC .............................................. C10J 3/32
See application file for complete search history.

(56) References Cited

U.S. PATENT DOCUMENTS

| 4,011,059 | A | * | 3/1977 | Daly et al. ............... 48/85.2 |
| 4,134,738 | A | | 1/1979 | Bress et al. |
| 4,396,401 | A | | 8/1983 | Davis |
| 4,453,949 | A | * | 6/1984 | Fasching et al. ............ 48/77 |
| 4,456,455 | A | * | 6/1984 | Shoebotham ............. 48/85.2 |
| 4,583,992 | A | * | 4/1986 | Rogers ...................... 48/76 |
| 2005/0155288 | A1 | * | 7/2005 | Rogers ................. 48/197 FM |
| 2005/0268556 | A1 | | 12/2005 | Rogers |
| 2006/0249021 | A1 | * | 11/2006 | Rogers ..................... 95/187 |
| 2008/0244976 | A1 | | 10/2008 | Paisley |
| 2010/0193743 | A1 | * | 8/2010 | Willacy .................... 252/373 |
| 2011/0036014 | A1 | * | 2/2011 | Tsangaris et al. ........... 48/62 R |
| 2011/0107735 | A1 | | 5/2011 | Steele et al. |
| 2011/0162278 | A1 | | 7/2011 | DePuy et al. |
| 2012/0005959 | A1 | | 1/2012 | Chen et al. |
| 2012/0017510 | A1 | * | 1/2012 | Leveson ..................... 48/76 |
| 2013/0014440 | A1 | | 1/2013 | DePuy et al. |
| 2013/0306913 | A1 | * | 11/2013 | Li et al. .................... 252/373 |

FOREIGN PATENT DOCUMENTS

| CN | 2883952 | Y | 3/2007 |
| CN | 201386074 | Y | 1/2010 |
| CN | 101701160 | A | 5/2010 |

(Continued)

OTHER PUBLICATIONS

Search Report and Written Opinion from corresponding EP Application No. 13157744, dated Jun. 19, 2013.

*Primary Examiner* — Imran Akram
(74) *Attorney, Agent, or Firm* — Sutherland Asbill & Brennan LLP

(57) ABSTRACT

The present application thus provides a gasifier for use in converting a feedstock material into a syngas. The gasifier may include an outer chamber, a reaction zone positioned within the outer chamber, and a disruption device maneuverable within the outer chamber to ensure a steady flow of the feedstock material into the reaction zone without bridging.

16 Claims, 4 Drawing Sheets

(56) References Cited

FOREIGN PATENT DOCUMENTS

| | | |
|---|---|---|
| DE | 102008021966 A1 | 11/2009 |
| EP | 0101143 A2 | 2/1984 |
| WO | 2011057040 A2 | 5/2011 |
| WO | 2011091080 A2 | 7/2011 |
| WO | 2012012823 A1 | 2/2012 |
| WO | WO 2012/012823 A1 * 2/2012 ................ C10J 3/58 |

* cited by examiner

BIOMASS GASIFIER WITH DISRUPTION DEVICE

TECHNICAL FIELD

The present application and the resultant patent relate generally to power generation systems and more particularly relate to a gasifier with an internal disruption device so as to prevent the bridging of biomass and other types of feedstock materials therein.

BACKGROUND OF THE INVENTION

In hydrocarbon gasification processes, solid fuels such as wood, agricultural wastes, and the like, are gasified to generate a gaseous fuel. Specifically, such gasification processes may convert a feedstock of biomass or other hydrocarbon into a gaseous mixture of carbon monoxide and hydrogen, i.e., a synthetic gas or a syngas referred to as a producer gas, by reaction with oxygen and steam in a gasifier. These gases then may be cleaned, processed, and utilized as a fuel in an engine to produce electricity. In other systems, the producer gas may be used to generate power, to produce fuel for heating, or to generate chemical products such as Fisher Tropsch liquids and the like Examples of such agricultural waste products include sugarcane and the like. Such biomass feedstock materials tend to be fibrous. As such, the biomass feedstock materials may tend to bridge across the interior of a gasifier when fed therein. Such a biomass bridge, when formed, may reduce the flow of the feedstock materials into the reaction zone and thus may have an impact on the output of the producer gas in terms of composition and flow rate.

One known method of reducing the bridging of feedstock materials in a gasifier involves an operator physically poking the bridge of feedstock materials with a pole. The need for operator intervention, however, may expose the operator to higher than normal levels of reaction product gases as well as exposure to the hot surfaces of the gasifier. Moreover, the need of operator intervention generally is not detected until there is some degradation in the overall performance of the gasifier.

There is thus a desire for an improved biomass gasifier. Preferably such an improved gasifier may prevent or limit the bridging of feedstock materials such as biomass materials so as to ensure a constant output of syngas without requiring manual operator intervention.

SUMMARY OF THE INVENTION

The present application and the resultant patent thus may provide a gasifier for use in converting a feedstock material into a syngas. The gasifier may include an outer chamber, a reaction zone positioned within the outer chamber, and a disruption device maneuverable within the outer chamber to ensure a steady flow of the feedstock material into the reaction zone without bridging.

The present application and the resultant patent further may provide a method of operating a gasifier to produce a syngas. The method may include the steps of flowing a feedstock material into an outer chamber of the gasifier, maneuvering a disruption device within the outer chamber to prevent the bridging of the feedstock material therein, and flowing the feedstock material into a reaction zone.

The present application and the resultant patent further may provide a biomass gasifier for use in converting a feedstock material into a syngas. The biomass gasifier may include an outer chamber, a reaction zone positioned within the outer chamber, and a disruption device maneuverable within the outer chamber to ensure a steady flow of the feedstock material into the reaction zone. The disruption device may include a shaft maneuvered by a drive device.

These and other features and advantages of the present application and the resultant patent will become apparent to one of ordinary skill in the art upon review of the following detailed description when taken in conjunction with the several drawings and the appended claims.

DETAILED DESCRIPTION

Figure 1:
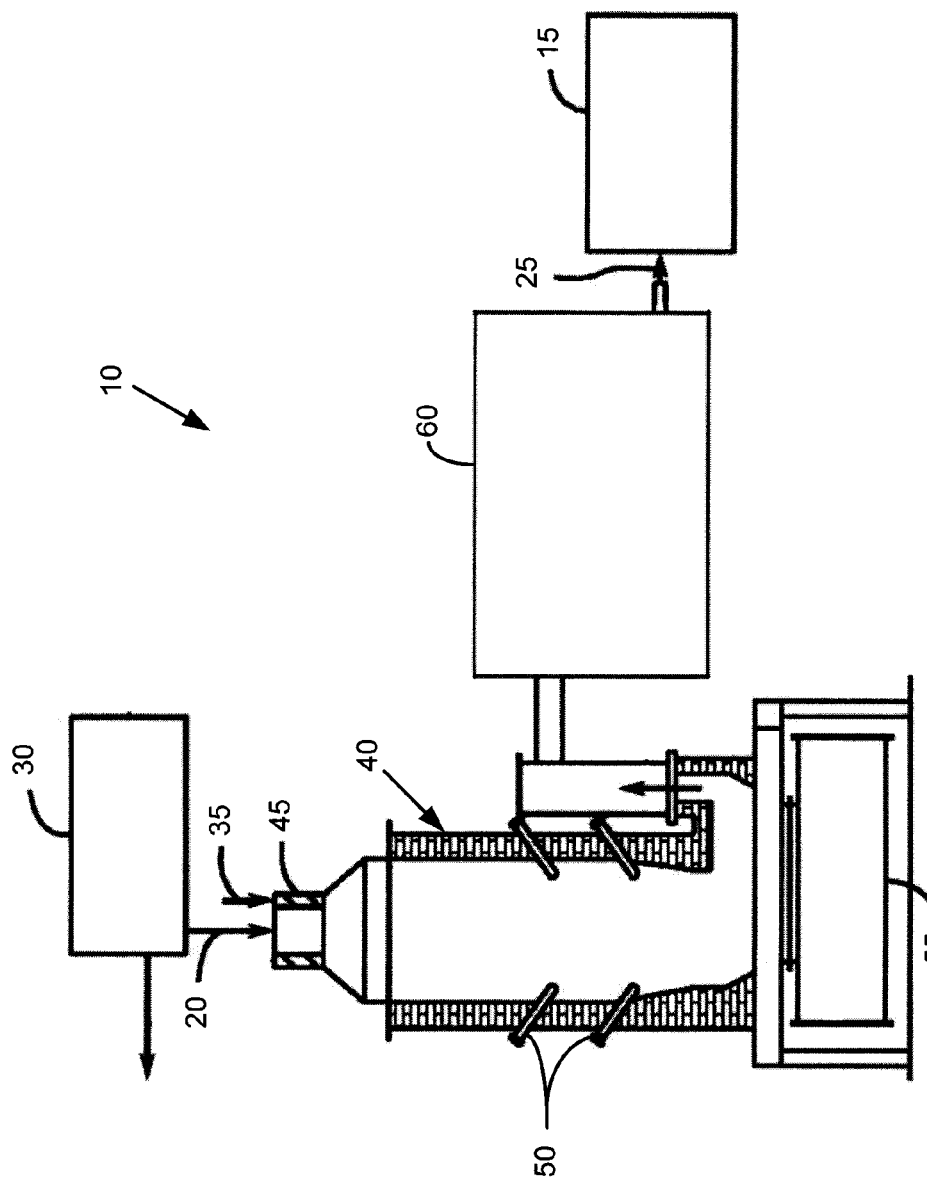
FIG. 1 is a schematic diagram of an example of a power plant with a gasifier.

Referring now to the drawings, in which like numerals refer to like elements throughout the several views, FIG. 1 shows a schematic diagram of a biomass gasification system 10. Only a high level description of the components of the biomass gasification system 10 related to the subject matter described herein is shown for the purpose of simplification. One of ordinary skill in the art will understand that the overall biomass gasification system 10 may have other configurations and may use many other types of components. The biomass gasification system 10 may be integrated with a power generation system 15.

Generally described, the biomass gasification system 10 gasifies a biomass feedstock 20 to produce a treated producer gas 25. The producer gas 25 is a type of diluted syngas that may be produced by relatively low temperature gasification of biomass in the presence of air. The producer gas 25 may be directed to the power generation system 15 as a fuel source to generate power and the like. As an example, the treated producer gas 25 may be combusted within one or more gas engines and the like contained within the power generation system 15 to produce electricity. Other types of power generators also may be used herein. The treated producer gas 25 also may have a number of other uses, such as fuel for heating, or the production of Fisher Tropsch liquids, and so on.

The biomass gasification system 10 may include a feedstock preparation unit 30 to prepare and condition the biomass feedstock 20. The conditioning may include selecting, sizing, and/or drying the biomass feedstock 20 as well as providing various types of additives. After preparation, the biomass feedstock 20 may be directed along with a source of air 35 to a biomass gasifier 40. As is shown, the biomass gasifier 40 may be an open air gasifier and the like. The biomass gasifier 40 may have an inlet 45 that enables the gasifier 40 to receive a substantially constant stream of the biomass feedstock 20 and the air 35. A series of reactions occur within the gasifier 40 including combustion of the biomass feedstock 20 and the air 35. The biomass feedstock 20 and the air 35 may be combusted at sub-stoichiometric fuel to air ratios to produce carbon monoxide (CO), hydrogen ($H_2$), carbon dioxide ($CO_2$), water ($H_2O$), and a hot char or hot ash bed. The gasifier 40 may include a number of air inlets 50 to promote this combustion. The gasifier 40 also may include an ash extraction system 55 configured to extract ash from the process.

The gasifier 40 thus may produce a flow of the producer gas 25. The producer gas 25 may be forwarded to one or more processing devices 60 for cleaning and the like. These processing devices 60 may include a cyclone, one or more scrubbing units, a filtering system, and the like. The producer gas 25 then may be provided to the power generation system 15 or otherwise directed. Other components and other configurations may be used herein.

Figure 2:
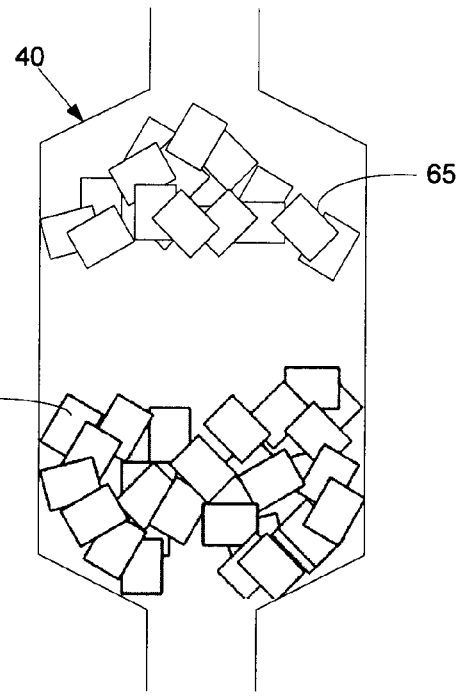
FIG. 2 is a schematic diagram of a known gasifier with a bridge of feedstock materials therein.

FIG. 2 shows a schematic diagram of an example of the gasifier 40. As described above, the feedstock materials 20 tend to form a bridge of material 65 therein. This bridge of material 65 may prevent entry of further feedstock materials 20 such that the resultant flow of the producer gas 25 produced therein may be reduced or otherwise compromised.

Figure 3:
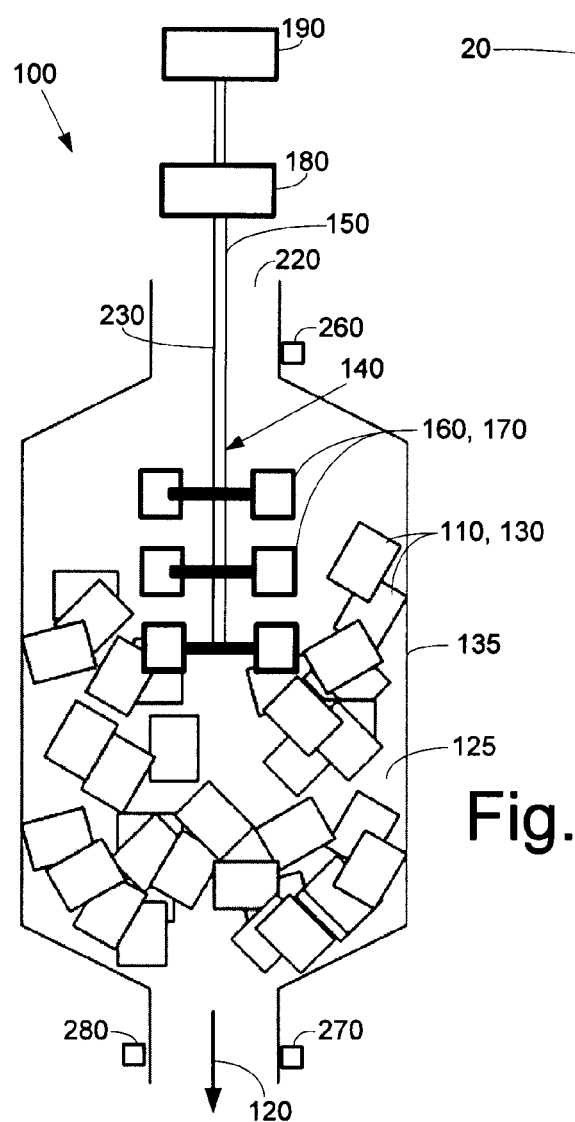
FIG. 3 is a schematic diagram of a gasifier with a disruption device as may be described herein.

FIG. 3 shows an example of a gasifier 100 as may be described herein. The gasifier 100 may be used with the power generation system 15 or elsewhere. The gasifier 100 converts a feedstock material 110 into a producer gas 120 or other type of syngas and the like in any manner. In this example, the feedstock materials 110 may take the form of any type of biomass materials 130. Any other types of feedstock materials 110, however, may be used herein. Other component and other configurations may be used herein The gasifier 100 may include a reaction zone 125 positioned within an outer chamber 135. The gasifier 100 also may include a disruption device 140 positioned within the outer chamber 135. The disruption device 140 may be any type of device or system that adequately disrupts the flow of the feedstock materials 110 when entering the gasifier 100 so as to prevent the creation of the feedstock bridge 65 similar to that described above. In the example of FIG. 3, the disruption device 140 may include a shaft 150 with a number of extensions 160 thereon. The shaft 150 may have any desired size, shape, or configuration. The extensions 160 may be in the form of a number of paddles 170 or any type of substantially horizontally extending structure. The paddles 170 or other types of the extensions 160 also may have any size, shape, or configuration. Any number of the paddles 170 or other types of the extensions 160 may be used herein in any orientation.

The shaft 150 may be maneuvered within the outer chamber 135 by a drive device 180. The drive device 180 may include a conventional electrical motor and the like. The drive device 180 may rotate the shaft 150, shake the shaft 150, vibrate the shaft 150, or impart any type of motion to the shaft 150 and hence the extensions 160 thereon. The gasifier 100 also may have an insertion device 190. The insertion device 190 also may include an electrical motor and the like. The insertion device 190 may insert and remove the disruption device 140 from the gasifier 100 in any orientation. Specifically, the disruption device 140 may be inserted manually or via the insertion device 190 and/or other types of insertion means. Alternatively, the disruption device 140 may be fixed within the gasifier 100. Other components and other configurations may be used herein.

Figure 4:
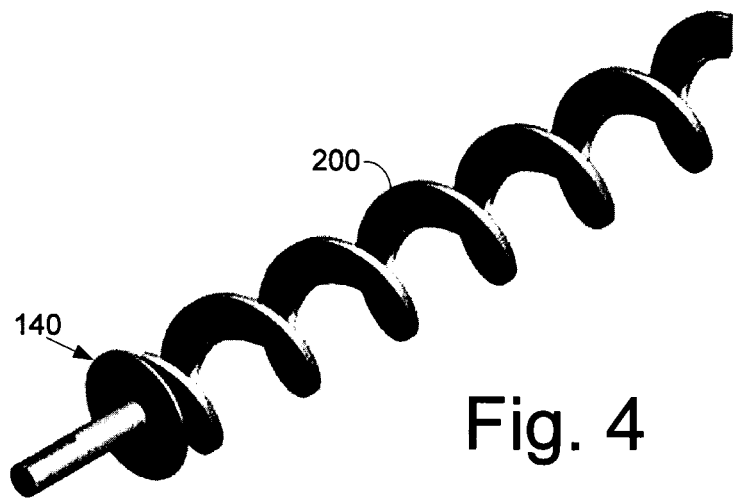
FIG. 4 is a schematic diagram of an alternative embodiment of a disruption device as may be described herein.
Figure 5:
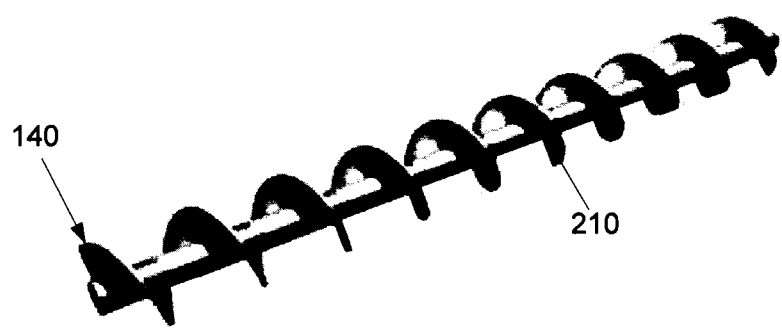
FIG. 5 is a schematic diagram of an alternative embodiment of a disruption device as may be described herein.

The disruption device 140 may use many different components and configurations. For example, FIG. 4 shows the disruption device 140 in the form of an extended spiral 200. The spiral 200 also may rotate, shake, vibrate, or otherwise be maneuvered therein to disrupt the creation of the bridge 80. Likewise, FIG. 5 shows the disruption device 140 in the form of an extended screw 210. As above, the extended screw 210 also may rotate, shake, vibrate, or otherwise be maneuvered therein to disrupt the creation of the bridge 80. Other components and other configurations may be used herein.

Figure 6:
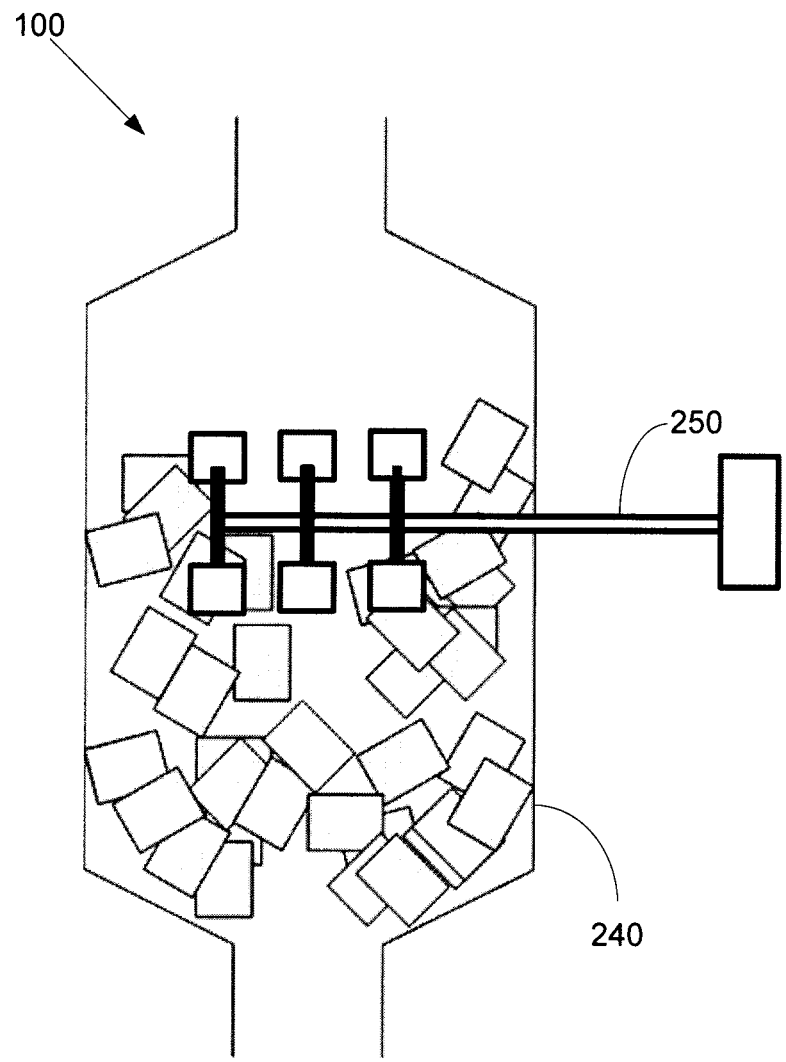
FIG. 6 is a schematic diagram of an alternative embodiment of a gasifier with a disruption device as may be described herein.

The orientation of the disruption device 140 also may vary. For example, FIG. 3 shows the insertion of the disruption device 140 through an upper inlet 220 of the gasifier 100 in a substantially vertical orientation 230. FIG. 6, however, shows the insertion of the disruption device 140 via a sidewall 240 of the gasifier 100 in a substantially horizontal orientation 250. Insertion of the disruption device 140 from any direction or orientation thus may be used herein. Other components and other configurations also may be used herein.

Operation of the disruption device 140 may be manually initiated or automatically initiated as part of a feedback loop. For example, a pressure drop across the gasifier 100 may be determined by an input pressure sensor 260 and an output pressure sensor 270 and similar types of devices. An increase in the pressure drop across the gasifier 100 as determined by the sensors 260, 270 may indicate an inadequate flow of the feedstock materials 110. Likewise, a flow sensor 280 and the like may be positioned about an exit of the gasifier 100 or elsewhere. A decrease in the flow of the syngas 120 also may indicate an inadequate flow of the feedstock materials 110. Other types of sensors may be used herein with different types of control logic. Other components and other configurations may be used herein.

The disruption device 140 thus prevents the bridge 65 of the feedstock materials 110 from forming within the gasifier 100. The disruption device 140 may rotate, shake, vibrate, or otherwise maneuver to ensure an adequate flow of the feedstock materials 110. As described above, the disruption device 140 may take many different forms, many different orientations, and many different forms of operation. By preventing the bridging of the feedstock materials 110, the gasifier 100 may provide a steady production of the producer gas 120 so as to ensure the steady operation of the overall power plant 15 and overall efficient power production. Moreover, manual operator intervention may be avoided herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gasifier for use in converting a feedstock material into a syngas, comprising:
   an outer chamber;
   a reaction zone positioned within the outer chamber, the reaction zone comprising an uppermost portion and a lowermost portion;
   a disruption device comprising at least two extensions, the disruption device maneuverable within the outer chamber to ensure a steady flow of the feedstock material into the reaction zone without bridging, wherein the disruption device is configured to maneuver from a first position where one of the at least two extensions is in contact with the uppermost portion of the reaction zone and a second position where one of the at least two extensions is in contact with the lowermost potion of the reaction zone;
   a controller in communication with the disruption device, wherein the controller is programmed to initiate maneuvering of the disruption device from the first position to the second position;
   an input pressure sensor in communication with the controller; and an output pressure sensor in communication with the controller;

wherein:
- the input pressure sensor is configured to measure a first pressure at an inlet of the gasifier;
- the output pressure sensor is configured to measure a second pressure at an outlet of the gasifier; and
- the controller is programmed to initiate maneuvering of the disruption device upon detecting a predetermined difference between the first pressure and the second pressure.

2. The gasifier of claim 1, wherein the disruption device comprises a shaft.

3. The gasifier of claim 2, wherein the disruption device comprises a drive device to maneuver the shaft within the outer chamber.

4. The gasifier of claim 2, wherein the disruption device comprises an insertion device to insert and remove the disruption device from within the chamber.

5. The gasifier of claim 1, wherein the at least two extensions are coaxially aligned.

6. The gasifier of claim 5, wherein the at least two extensions comprise one or more paddles.

7. The gasifier of claim 1, wherein the disruption device comprises an extended spiral.

8. The gasifier of claim 1, wherein the disruption device comprises an extended screw.

9. The gasifier of claim 1, wherein the outer chamber comprises an upper inlet and wherein the disruption device comprises a substantially vertical orientation.

10. The gasifier of claim 1, wherein the outer chamber comprises a sidewall and wherein the disruption device comprises a substantially horizontal orientation.

11. The gasifier of claim 1, wherein the predetermined difference is a percentage of an initial difference between the first pressure and the second pressure.

12. A biomass gasifier for use in converting a feedstock material into a syngas, comprising:
- an outer chamber;
- a reaction zone positioned within the outer chamber, the reaction zone comprising an uppermost portion and a lowermost portion;
- a disruption device maneuverable within the outer chamber to ensure a steady flow of the feedstock material into the reaction zone, the disruption device comprising a shaft and at least two extensions, the disruption device maneuvered by a drive device, wherein the disruption device is configured to maneuver from a first position where one of the at least two extensions is in contact with the uppermost portion of the reaction zone and a second position where one of the at least two extensions is in contact with the lowermost potion of the reaction zone;
- a controller in communication with the disruption device, wherein the controller is programmed to initiate maneuvering of the disruption device from the first position to the second position;
- an input pressure sensor in communication with the controller; and
- an output pressure sensor in communication with the controller;

wherein:
- the input pressure sensor is configured to measure a first pressure at an inlet of the gasifier;
- the output pressure sensor is configured to measure a second pressure at an outlet of the gasifier; and
- the controller is programmed to initiate maneuvering of the disruption device upon detecting a predetermined difference between the first pressure and the second pressure.

13. The biomass gasifier of claim 12, wherein the disruption device comprises an insertion device to insert and remove the disruption device from within the outer chamber.

14. The biomass gasifier of claim 12, wherein the at least two extensions are attached to the shaft such that the at least two extensions are coaxially aligned.

15. The biomass gasifier of claim 12, wherein the shaft comprises an extended spiral.

16. The biomass gasifier of claim 12, wherein the shaft comprises an extended screw.

\* \* \* \* \*